United States Patent
Kaakani et al.

(10) Patent No.: US 7,827,373 B2
(45) Date of Patent: Nov. 2, 2010

(54) SYSTEM AND METHOD FOR MANAGING A SHORT-TERM HEAP MEMORY

(75) Inventors: Ziad M. Kaakani, Scottsdale, AZ (US); Pratap Parashuram, Bangalore (IN); Elliott H. Rachlin, Scottsdale, AZ (US); Jethro F. Steinman, Havertown, PA (US)

(73) Assignee: Honeywell International Inc., Morristown, NJ (US)

( * ) Notice: Subject to any disclaimer, the term of this patent is extended or adjusted under 35 U.S.C. 154(b) by 442 days.

(21) Appl. No.: 11/263,114

(22) Filed: Oct. 31, 2005

(65) Prior Publication Data

US 2007/0101091 A1    May 3, 2007

(51) Int. Cl.
G06F 12/00    (2006.01)
G06F 13/00    (2006.01)
G06F 13/28    (2006.01)

(52) U.S. Cl. ............ 711/170; 711/154; 711/E12.006
(58) Field of Classification Search ............ 711/170
See application file for complete search history.

(56) References Cited

U.S. PATENT DOCUMENTS

| | | | |
|---|---|---|---|
| 5,218,698 A | | 6/1993 | Mandl |
| 5,761,738 A | * | 6/1998 | Jones ............ 711/170 |
| 5,809,554 A | * | 9/1998 | Benayon et al. ............ 711/171 |
| 5,893,086 A | * | 4/1999 | Schmuck et al. ............ 707/1 |
| 6,442,661 B1 | * | 8/2002 | Dreszer ............ 711/170 |
| 6,654,773 B2 | | 11/2003 | Hills |
| 6,681,306 B1 | * | 1/2004 | Kessler et al. ............ 711/171 |
| 6,694,346 B1 | * | 2/2004 | Aman et al. ............ 718/104 |
| 6,757,699 B2 | * | 6/2004 | Lowry ............ 707/205 |
| 6,766,336 B2 | | 7/2004 | Kawamoto |
| 6,799,253 B1 | | 9/2004 | Peterson |
| 6,804,765 B2 | | 10/2004 | Kolodner et al. |
| 6,839,726 B2 | * | 1/2005 | Kawamoto ............ 707/206 |
| 2002/0055929 A1 | * | 5/2002 | Kolodner et al. ............ 707/103 R |
| 2002/0055941 A1 | | 5/2002 | Kolodner et al. |
| 2003/0023949 A1 | | 1/2003 | Hagmeier et al. |

(Continued)

OTHER PUBLICATIONS

Brian Marshall; "How C Programming Works"; Mar. 11, 2004; pp. 1-4; http://web.archive.org/web/20040311122030/http://computer.howstuffworks.com/c28.htm.*

(Continued)

Primary Examiner—Matt Kim
Assistant Examiner—Christopher D Birkhimer
(74) Attorney, Agent, or Firm—Munck Carter, LLP

(57) ABSTRACT

A method includes executing one or more applications in an execution environment. The one or more applications are capable of requesting allocation of memory during execution. The method also includes allocating a plurality of memory blocks in a heap to the one or more executing applications. The plurality of memory blocks are allocated sequentially in the heap to the one or more executing applications. In addition, the method includes deallocating the plurality of memory blocks during a single deallocation. Memory blocks in multiple heaps could be allocated to the one or more executing applications. A particular memory block in a particular heap could be allocated to a particular executing application by pushing an indicator identifying the particular heap onto a stack. The particular memory block is allocated in the particular heap based on the indicator, and the indicator is popped from the stack after allocation.

21 Claims, 5 Drawing Sheets

U.S. PATENT DOCUMENTS

| | | | |
|---|---|---|---|
| 2003/0028739 A1* | 2/2003 | Li et al. | 711/170 |
| 2003/0073497 A1* | 4/2003 | Nelson | 463/42 |
| 2003/0182529 A1* | 9/2003 | Fairweather | 711/170 |
| 2003/0212719 A1* | 11/2003 | Yasuda et al. | 707/206 |
| 2004/0073913 A1* | 4/2004 | Fairweather | 719/328 |
| 2004/0139272 A1* | 7/2004 | Rodriguez-Rivera et al. | 711/100 |
| 2004/0139284 A1* | 7/2004 | Clayton et al. | 711/147 |
| 2004/0158828 A1* | 8/2004 | Zimmer et al. | 717/168 |
| 2004/0230762 A1* | 11/2004 | Allen et al. | 711/170 |
| 2005/0149589 A1 | 7/2005 | Bacon et al. | |
| 2005/0149686 A1 | 7/2005 | Bacon et al. | |
| 2005/0257120 A1 | 11/2005 | Gorobets et al. | |
| 2007/0011415 A1* | 1/2007 | Kaakani et al. | 711/159 |

OTHER PUBLICATIONS

Brian Marshall; "How C Programming Works"; Jun. 3, 2004; pp. 1-11; http://web.archive.org/web/20040603155240/http://computer.howstuffworks.com/c29.htm.*

Hanson D R., Fast Allocation and Deallocation of Memory Based on Object Lifetimes, Software Practice & Exper, Bognor Regis, GB, Jan. 1990, vol. 20, No. 1, p. 5-12, XP000095792.

Okehee Goh et al., "Schedulable Persistence System for Real-Time Embedded Applications in CLI," 10 pages, 2005.

Okehee Goh et al., "Schedulable Persistence System for Real-Time Applications in VMs," 10 pages, 2006.

Okehee Goh et al., "Integrated Scheduling with Garbage Collection for Real-Time Embedded Applications in CLI," 8 pages, 2006.

Okehee Goh et al., "A Schedulable Garbage Collection for Embedded Applications in CLI," 10 pages, Aug. 2005.

Okehee Goh et al., "A Real-Time Garbage Collector for Embedded Applications in CLI," 2 pages, May 2004.

David F. Bacon et al., "The Metronome: A Simpler Approach to Garbage Collection in Real-Time Systems," IBM Research, 20 pages, Nov. 5, 2003.

David F. Bacon et al., "Controlling Fragmentation and Space Consumption in the Metronome," IBM T.J. Watson Research Center, 28 pages, 2003.

David Bacon et al., "A Mostly Non-Copying Real-Time Collector with Low Overhead and Consistent Utilization," IBM T.J. Watson Research, 42 pages, 2003.

David F. Bacon et al., "The Metronome: A Hard Real-Time Garbage Collector," IBM T.J. Watson Research Center, 42 pages, 2003.

David Tarditi, "Compact Garbage Collection Tables," 9 pages, Oct. 2000.

Fridtjof Siebert, "Constant-Time Root Scanning for Deterministic Garbage Collection," 15 pages, 2001.

Hans-Juergen Boehm, Garbage Collection in an Uncooperative Environment,1988, pp. 1-17.

www.mono-project.com, printed Sep. 2007, 45 pages.

www.hpl.hp.com/personal/Hans-Boehm/gc/index.html, printed Sep. 2007, 6 pages.

www.rtsj.org/specjavadoc/book-index.html, see esp. "Memory Management" Section, 453 pages.

Okehee Goh et al., "A Real-Time Garbage Collection for Embedded Applications in CLI," 15 pages.

* cited by examiner

SYSTEM AND METHOD FOR MANAGING A SHORT-TERM HEAP MEMORY

CROSS-REFERENCE TO RELATED APPLICATIONS

This application is related to the following U.S. Patent Applications:

Ser. No. 11/175,848 entitled "DETERMINISTIC RUNTIME EXECUTION ENVIRONMENT AND METHOD" filed on Jul. 6, 2005; and Ser. No. 11/175,703 entitled "APPARATUS AND METHOD FOR DETERMINISTIC GARBAGE COLLECTION OF A HEAP MEMORY" filed on Jul. 6, 2005;

both of which are hereby incorporated by reference.

TECHNICAL FIELD

This disclosure relates generally to computing systems and more specifically to a system and method for managing a short-term heap memory.

BACKGROUND

Several attempts have been made to create "execution environments" in which certain types of computer programs are executed. In general, a conventional execution environment provides support for basic features that many programs assume are available for use. For example, conventional execution environments typically include support for performing various mathematical functions (such as sine and cosine operations), input/output functions (such as reading and writing files), and communication functions (such as network and database access). Some conventional execution environments provide additional functionality, such as just-in-time compilation of code, machine independence and portability, remote operation, and enhanced internetworking. The Common Language Infrastructure (CLI) by MICROSOFT CORPORATION and JAVA by SUN MICROSYSTEMS are examples of execution environments.

Conventional execution environments often support the management of memory used during execution of computer programs. Memory is typically a finite resource needing careful management so that programs needing memory can obtain it when necessary. There are often several types or classes of memory in an execution environment, including a "heap memory" or "heap". The heap typically represents memory that is highly dynamic in its use, meaning that heap memory is frequently allocated to programs that use it for a short time and then return it for reuse by other programs. A "heap manager" often controls when and how the heap memory is used by the computer programs.

A problem with conventional execution environments is that they are not deterministic in nature. The term "deterministic" generally refers to the ability to predict or specify the behavior of a program or environment. Conventional execution environments are not deterministic because they typically suffer from occasional and unpredictable delays, including delays associated with the functions performed by the heap manager. These delays represent non-deterministic behavior in the conventional execution environments.

This typically makes these execution environments unsuitable for use with real-time applications. Real-time applications may represent programs that interact with an outside environment or otherwise operate in a way that is carefully timed. The non-deterministic behavior of conventional execution environments often translates into or causes non-deterministic behavior in the execution of real-time applications. As a result, the real-time applications often cannot maintain their exact time schedules when executed in conventional execution environments, which causes the real-time applications to fail.

SUMMARY

This disclosure provides a system and method for managing a short-term heap memory.

In a first embodiment, a method includes executing one or more applications in an execution environment. The one or more applications are capable of requesting allocation of memory during execution. The method also includes allocating a plurality of memory blocks in a heap to the one or more executing applications. The plurality of memory blocks are allocated sequentially in the heap to the one or more executing applications. In addition, the method includes deallocating the plurality of memory blocks during a single deallocation.

In particular embodiments, memory blocks in multiple heaps are allocated to the one or more executing applications. A particular memory block in a particular heap is allocated to a particular executing application by pushing an indicator identifying the particular heap onto a stack. The particular memory block is allocated in the particular heap based on the indicator, and the indicator is popped from the stack after allocation.

In other particular embodiments, the execution environment represents a deterministic execution environment, and the one or more executing applications include one or more real-time applications.

In a second embodiment, an apparatus includes a memory having a heap. The apparatus also includes a memory manager capable of allocating a plurality of memory blocks in the heap to one or more applications executed in an execution environment. The memory manager is capable of allocating the plurality of memory blocks sequentially in the heap to the one or more executing applications. The memory manager is also capable of deallocating the plurality of memory blocks during a single deallocation.

In a third embodiment, a computer program is embodied on a computer readable medium and is operable to be executed by a processor. The computer program includes computer readable program code for allocating a plurality of memory blocks in a heap to one or more applications executed in an execution environment. The plurality of memory blocks are allocated sequentially in the heap to the one or more executing applications. The computer program also includes computer readable program code for deallocating the plurality of memory blocks during a single deallocation.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
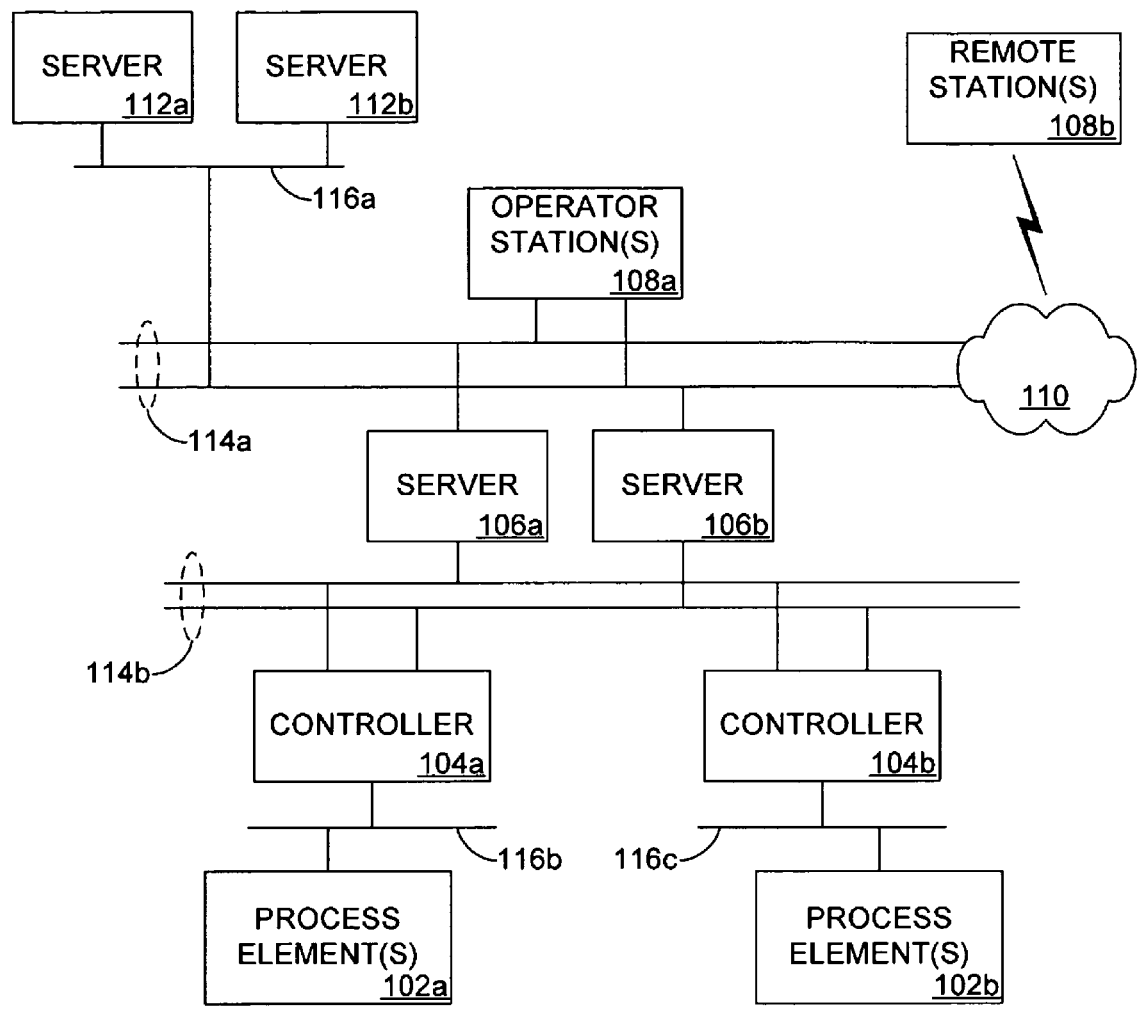
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent motors, catalytic crackers, valves, and other industrial equipment in a production environment. The process elements 102a-102b could represent any other or additional components in any suitable process or production system. Each of the process elements 102a-102b includes any hardware, software, firmware, or combination thereof for performing one or more functions in a process or production system.

Two controllers 104a-104b are coupled to the process elements 102a-102b. The controllers 104a-104b control the operation of the process elements 102a-102b. For example, the controllers 104a-104b could be capable of providing control signals to the process elements 102a-102b periodically. As a particular example, if a process element represents a motor, one of the controllers 104a-104b could provide control information to the motor once every millisecond. Each of the controllers 104a-104b includes any hardware, software, firmware, or combination thereof for controlling one or more of the process elements 102a-102b. The controllers 104a-104b could, for example, include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. The servers 106a-106b could, for example, represent personal computers (such as desktop computers) executing WINDOWS 2000 from MICROSOFT CORPORATION. As another example, the servers 106a-106b could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b. The operator stations 108a-108b represent computing or communication devices providing user access to the servers 106a-106b, which could then provide user access to the controllers 104a-104b and the process elements 102a-102b. For example, the operator stations 108a-108b could allow users to review the operational history of the process elements 102a-102b using information collected by the controllers 104a-104b and servers 106a-106b. The operator stations 108a-108b could also allow the users to adjust the operation of the process elements 102a-102b, controllers 104a-104b, or servers 106a-106b. Each of the operator stations 108a-108b includes any hardware, software, firmware, or combination thereof for supporting user access and control of the system 100. The operator stations 108a-108b could, for example, represent personal computers executing WINDOWS 95, WINDOWS 2000, or WINDOWS NT from MICROSOFT CORPORATION.

In this example, at least one of the operator stations 108b is a remote station. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116c that support communication between components in the system 100. Each of these networks 114a-114b, 116a-116c represents any suitable network or combination of networks facilitating communication between components in the system 100. The networks 114a-114b, 116a-116c could, for example, represent Ethernet networks.

In one aspect of operation, one or more of the controllers 104a-104b, servers 106a-106b, or other components in the system 100 execute one or more applications, such as real-time applications, to control the process elements 102a-102b. For example, the controllers 104a-104b could periodically generate control signals or other signals needed by the process elements 102a-102b to operate correctly.

In some embodiments, at least one of the components in the system 100 also executes, supports, or otherwise provides access to an execution environment. For example, the execution environment could be supported in each of the controllers 104a-104b and the servers 106a-106b of the system 100. The execution environment provides support for various features that managed applications may use during execution. As examples, the execution environment could provide support for mathematical functions, input/output functions, communication functions, and heap memory management functions. The phrase "managed application" refers to an application executed in the execution environment, where the execution of the application is managed by the execution environment. Managed applications could include the real-time applications used to control the process elements 102a-102b in the system 100.

In particular embodiments, the execution environment used in the system 100 to execute the managed applications is deterministic. A deterministic execution environment is an execution environment whose behavior is predictable or that can be precisely specified. Because the execution environment is deterministic in nature, there is a reduced likelihood that real-time managed applications will be unable to maintain their exact time schedules when executed. This also reduces the likelihood that the managed applications will fail. The execution environment could be implemented in any suitable manner, such as by using .Net programming based on the CLI specification as ratified by ECMA-335 and support both the Kernel and Compact profiles.

A heap memory generally represents memory used to store data created when an application is actually executed. A heap memory managed in the execution environment could represent a memory in one of the controllers 104a-104b or servers 106a-106b, such as a random access memory or other type of memory. Management of the heap memory may involve various tasks or processes. For example, it may involve creating or initializing a heap memory when needed. It may also involve supporting multiple types of heap memory, such as a short-term heap and a long-term heap. In addition, it may involve determining when to reclaim space in the heap memory and when to recycle the entire heap memory. As described in more detail below, the execution environment may include a memory manager, which supports the management of heap memory in general and short-term heap memory specifically.

Although FIG. 1 illustrates one example of a process control system 100, various changes may be made to FIG. 1. For example, a control system could include any number of process elements, controllers, servers, and operator stations. Also, FIG. 1 illustrates one operational environment in which a short-term heap memory could be used. The short-term heap memory could be used in any other suitable device or system.

Figure 2:
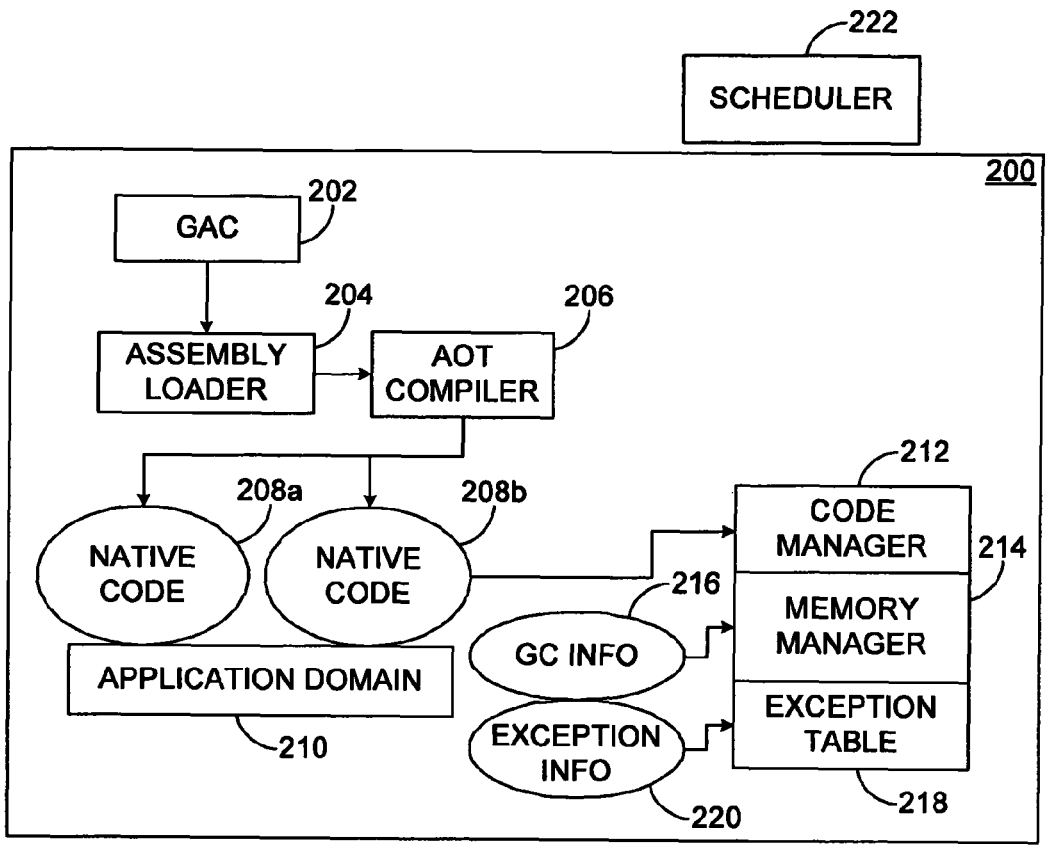
FIG. 2 illustrates an example execution environment according to one embodiment of this disclosure.

FIG. 2 illustrates an example execution environment 200 according to one embodiment of this disclosure. The embodiment of the execution environment 200 shown in FIG. 2 is for illustration only. Other embodiments of the execution environment could be used without departing from the scope of this disclosure. Also, for ease of explanation, the execution environment 200 is described as being implemented in the controllers 104a-104b or the servers 106a-106b of FIG. 1, although the execution environment 200 could be used in any other suitable device or system.

In this example embodiment, the execution environment 200 includes a global assembly cache (GAC) 202. The global assembly cache 202 represents a memory capable of storing different assembly code programs to be executed in the execution environment 200. The assembly code programs could represent the managed applications to be executed in the execution environment 200. As an example, the global assembly cache 202 could store an assembly code program capable of controlling one or more of the process elements 102a-102b of FIG. 1. The global assembly cache 202 could store multiple assembly code programs and/or different versions of the same assembly code program. The global assembly cache 202 represents any suitable storage and retrieval device or devices.

An assembly loader 204 loads assembly code into the execution environment 200 for execution. For example, the assembly loader 204 may retrieve new assembly code downloaded by a user into the global assembly cache 202. The assembly loader 204 may then load the identified assembly code into a compiler for compilation and use in the execution environment 200. The assembly loader 204 includes any hardware, software, firmware, or combination thereof for loading assembly code for compilation. The assembly loader 204 could, for example, represent a software thread executed in the background of the execution environment 200.

An ahead-of-time (AOT) compiler 206 compiles the assembly code loaded by the assembly loader 204. The AOT compiler 206 represents a load-time compiler that compiles assembly code when the assembly code is loaded. For example, the AOT compiler 206 may convert assembly code from an intermediate language to native executable code capable of being executed in the execution environment 200. Also, the AOT compiler 206 could insert instructions into the native executable code to ensure proper execution of the code in the execution environment 200. The AOT compiler 206 includes any hardware, software, firmware, or combination thereof for compiling assembly code. The AOT compiler 206 could, for example, represent a software thread executed in the background of the execution environment 200.

The AOT compiler 206 produces native executable code, such as native executable codes 208a-208b. The native executable codes 208a-208b represent executable code capable of being executed in the execution environment 200. The native executable codes 208a-208b could provide any suitable functionality in the execution environment 200, such as providing control of one or more process elements 102a-102b of FIG. 1. The native executable codes 208a-208b could provide any other or additional functionality in the execution environment 200.

One or more application domains 210 represent the domains in which one or more managed applications (such as the applications implemented by the native executable codes 208a-208b) are executed in the execution domain 200. Each application domain 210 represents any suitable domain for executing one or more managed applications. While shown as a single application domain 210 in FIG. 2, multiple application domains 210 could be used.

The assembly codes and native executable codes in the execution environment 200 are managed by a code manager 212. For example, the code manager 212 may control the loading and unloading of assembly code in the execution environment 200. As a particular example, the code manager 212 could cause the assembly loader 204 to load assembly code into the AOT compiler 206, which generates native executable code that is loaded into the application domain 210. The code manager 212 could also unload native executable code from the application domain 210. The code manager 212 includes any hardware, software, firmware, or combination thereof for managing assembly code and/or compiled code used in the execution environment 200. The code manager 212 could, for example, represent a software thread executed in the background of the execution environment 200.

The execution environment 200 also includes a memory manager 214. The memory manager 214 represents a deterministic memory manager that manages the use of a heap memory. For example, the memory manager 214 could allocate blocks of heap memory to managed applications being executed in the application domain 210. The memory manager 214 could also use garbage collection information 216 to release blocks of heap memory that are no longer being used by the managed applications. The garbage collection information 216 could, for example, be generated by a garbage collection process provided by the memory manager 214 and executed in the background of the execution environment 200. In addition, the memory manager 214 could support a defragmentation process for the heap memory. The defragmentation process could be used to combine unused blocks of heap memory into larger blocks. The memory manager 214 includes any hardware, software, firmware, or combination thereof for managing a heap memory. The memory manager 214 could, for example, represent a software thread executed in the background of the execution environment 200.

In addition, the execution environment 200 includes an exception table 218, which stores exception information 220. The exception information 220 identifies various problems experienced in the execution environment 200. Example problems could include attempting to load assembly code that does not exist in an explicitly specified location or in the global assembly cache 202, an error during compilation of loaded assembly code, or attempting to unload assembly code not previously loaded. An application or process being executed in the execution environment 200 could generate an exception identifying a detected problem. The exception is identified by the exception information 220, which is stored in the exception table 218 for later use (such as during debugging) or for use by the application or process for automatic recovery at runtime.

A scheduler 222 is used to schedule execution of the managed applications. The scheduler 222 may also be used to schedule execution of housekeeping tasks in the execution environment 200. The housekeeping tasks include, among other things, heap memory management, assembly loading and unloading, and assembly compilation. For example, the scheduler 222 could support time slicing to allow multiple threads to be executed, where the threads represent the housekeeping tasks and the managed applications. The scheduler 222 includes any hardware, software, firmware, or combination thereof for scheduling the execution of applications and other tasks.

In some embodiments, the scheduler 222 and the execution environment 200 cooperate and collaborate to ensure that the managed applications and the housekeeping tasks are executed properly. For example, the scheduler 222 may control when and for how long the housekeeping tasks may be executed in the execution environment 200. As a particular example, the scheduler 222 could preempt all threads executing the managed applications and then call the execution environment 200 to execute one or more housekeeping tasks. The scheduler 222 informs the execution environment 200 of the amount of time available to perform the housekeeping tasks. The execution environment 200 guarantees that control is returned to the scheduler 222 on or before the expiration of that amount of time. While the execution environment 200 is performing a housekeeping task, managed applications that read or write data to a heap memory may not interrupt the housekeeping task. Other threads that do not access a heap memory (such as an interrupt service routine or ISR) could be allowed to interrupt a housekeeping task. Averaged over time, the scheduler 222 may provide the execution environment 200 with enough time to perform the housekeeping tasks needed for the managed applications to execute properly. As an example, the managed applications may use up to approximately 80% of the time slices available, while the remaining 20% are used by the housekeeping tasks.

This type of scheduling may impose certain requirements on the managed applications. For example, the managed applications should, over time, allow adequate processing resources to be provided to and used by the housekeeping tasks. Also, a managed application should either come to a "clean point" or use read and write barriers before transferring control to the housekeeping tasks. A "clean point" generally represents a point where a sequence of related instructions being executed for the managed application has been completed, rather than a point that occurs during execution of the sequence of related instructions. As an example, a managed application should complete accessing data in a data structure or file when the transfer of control occurs, rather than being in the middle of reading data or writing data. A read or write barrier is used when the managed application is not at a clean point when the transfer of control occurs. The read or write barrier generally represents a marker or flag used to inform the housekeeping tasks that particular data is currently being used by a managed application. This may prevent the housekeeping tasks from moving the data during defragmentation or discarding the data during garbage collection.

In some embodiments, the various components shown in FIG. 2 operate over a platform/operating system abstraction layer. The platform/operating system abstraction layer logically separates the execution environment 200 from the underlying hardware platform or operating system. In this way, the execution environment 200 may be used with different hardware platforms and operating systems without requiring the execution environment 200 to be specifically designed for a particular hardware platform or operating system.

Although FIG. 2 illustrates one example of an execution environment 200, various changes may be made to FIG. 2. For example, the functional division shown in FIG. 2 is for illustration only. Various components in FIG. 2 could be combined or omitted and additional components could be added according to particular needs.

Figure 3:
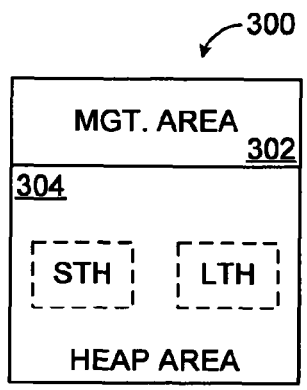
FIG. 3 illustrates an example heap memory according to one embodiment of this disclosure.

FIG. 3 illustrates an example heap memory 300 is according to one embodiment of this disclosure. The embodiment of the heap memory 300 shown in FIG. 3 is for illustration only. Other embodiments of the heap memory could be used without departing from the scope of this disclosure. Also, for ease of explanation, the heap memory 300 is described as being managed by the memory manager 214 in the execution environment 200 of FIG. 2. The heap memory 300 could be used in any other environment and with any other suitable device.

As shown in FIG. 3, the heap memory 300 includes a management area 302 and a heap area 304. The management area 302 stores information used to manage the heap memory 300. For example, the management area 302 may include information identifying used and unused blocks of memory in the heap area 304. The heap area 304 stores information used by managed applications and housekeeping tasks executed in the execution environment 200. In some embodiments, the management area 302 and the heap area 304 are located adjacent to one another. In particular embodiments, both of the areas 302-304 are provided in response to a single request when a heap is created.

The heap area 304 typically includes used blocks of memory and unused or "free" blocks of memory. Used blocks of memory are allocated to one or more managed applications for use during execution. Free blocks of memory are not allocated to any applications and are available to be allocated by the memory manager 214. In some embodiments, each block of memory in the heap area 304 includes a value identifying the size of the block at the beginning and the end of the block. For example, a free block may have its size denoted with a positive value in both the first and last positions of the block. A used block may have its size denoted with a negative value in both the first and last positions of the block.

The heap memory 300 shown in FIG. 3 could represent one instance of a heap memory. Multiple instances of the heap memory 300 could be used in the execution environment 200. Also, multiple types of heap memory 300 could be used in the execution environment 200. For example, the memory manager 214 could divide a single heap memory 300 into a short-term heap (STH) and a long-term heap (LTH), or the memory manager 214 could create separate short-term and long-term heap memories 300. The short-term heap could provide support for shorter duration and higher-rate usage of memory. The long-term heap could provide support for longer duration or permanent usage of memory. A third type of heap could represent a conventional heap, which may be accessed by unmanaged applications in a conventional manner (such as by using malloc and free commands). In this document, the phrases "short-term" and "long-term" are relative terms and do not imply any specific lengths of use of a heap memory.

Although FIG. 3 illustrates one example of a heap memory 300, various changes may be made to FIG. 3. For example, the heap memory 300 could include additional sections for storing information, or the two sections of FIG. 3 could be combined into a single section. Also, the size of each section of the heap memory 300 may vary, such as when the management area 302 is smaller for a short-term heap memory 300 than for a long-term heap memory 300.

Figure 4:
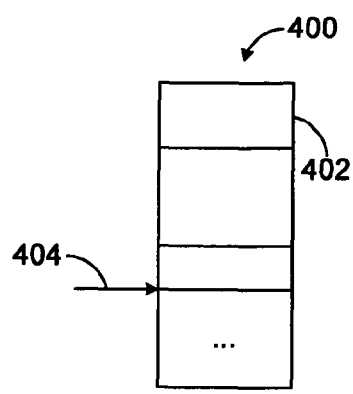
FIG. 4 illustrates an example short-term heap memory according to one embodiment of this disclosure.

FIG. 4 illustrates an example short-term heap memory 400 according to one embodiment of this disclosure. The embodiment of the short-term heap memory 400 shown in FIG. 4 is for illustration only. Other embodiments of the short-term heap memory could be used without departing from the scope of this disclosure. Also, for ease of explanation, the short-term heap memory 400 is described as being part of the heap memory 300 of FIG. 3, which is managed by the memory manager 214 in the execution environment 200 of FIG. 2. The short-term heap memory 400 could be used in any other environment and with any other suitable device.

In this example, the short-term heap memory 400 represents a stack. The short-term heap memory 400 includes various blocks 402, each of which represents a block of memory capable of storing data that has been allocated to a managed application. Each of the blocks 402 may represent any suitable quantity of memory space, depending on the memory needs of the managed applications requesting use of the short-term heap memory 400.

A pointer 404 identifies a location in the short-term heap memory 400. For example, the pointer 404 may identify the beginning of unallocated memory space in the short-term heap memory 400. When a new block 402 is allocated from the short-term heap memory 400, the new block 402 may be allocated starting at the location of the pointer 404, and the pointer 404 moves to the end of the new block 402. The blocks 402 are therefore allocated sequentially in the short-term heap memory 400. Free space in the short-term heap memory 400 may be easily determined by computing a difference between the memory address identified by the pointer 404 and the last memory address of the short-term heap memory 400. Multiple or all used blocks 402 in the short-term heap memory 400 may be deallocated and recovered at the same time or during a single operation. Deallocation could involve resetting the pointer 404 to point to the beginning of the short-term heap memory 400.

In this way, memory space in the short-term heap memory 400 may be allocated and deallocated very rapidly. This may also reduce or eliminate fragmentation of the short-term heap memory 400 and provide for easy tracking of available free space in the short-term heap memory 400.

In some embodiments, the short-term heap memory 400 may represent a short-term heap included within the heap area 304 of a heap memory 300. In other embodiments, the short-term heap memory 400 may represent the heap area 304 itself or the heap memory 300 itself.

Although FIG. 4 illustrates one example of a short-term heap memory 400, various changes may be made to FIG. 4. For example, the short-term heap memory 400 could include any suitable number of blocks 402 when in use by the managed applications. Also, the short-term heap memory 400 could include any suitable amount of total memory space.

Figure 5:
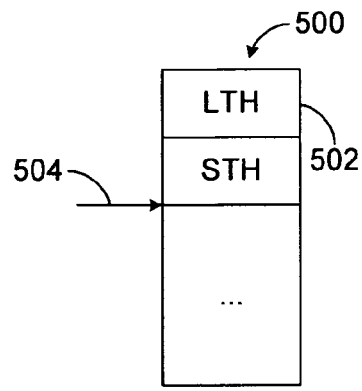
FIG. 5 illustrates an example heap memory context stack according to one embodiment of this disclosure.

FIG. 5 illustrates an example heap memory context stack 500 according to one embodiment of this disclosure. The embodiment of the heap memory context stack 500 shown in FIG. 5 is for illustration only. Other embodiments of the heap memory context stack could be used without departing from the scope of this disclosure. Also, for ease of explanation, the heap memory context stack 500 is described as operating with the heap memory 300 of FIG. 3 and the memory manager 214 in the execution environment 200 of FIG. 2. The heap memory context stack 500 could be used in any other environment and with any other suitable heap or device.

The heap memory context stack 500 represents a stack that includes various entries 502, each of which is capable of storing a data value. Also, a pointer 504 identifies a location in the heap memory context stack 500. For example, the pointer 504 may identify the first unused memory location in the heap memory context stack 500. A new data value may be pushed onto the heap memory context stack 500 starting at the location of the pointer 504, and a data value may be popped from the heap memory context stack 500 at the location preceding the pointer 504. The heap memory context stack 500 may include any suitable number of entries 502, and each entry 502 may include any suitable amount of memory space.

To support the use of short-term and long-term heaps in the execution environment 200, the memory manager 214 uses the heap memory context stack 500 to support a redirection mechanism. The redirection mechanism directs requests for heap memory to either the short-term heap or the long-term heap. For example, in some embodiments, various application programming interfaces (APIs) (such as GetMemoryFloating( ) and GetMemoryFixed( ) can be used to request a block of heap memory. The heap memory context stack 500 is used to determine whether the block of heap memory is provided from a short-term heap or a long-term heap.

In some embodiments, a PushHeapSelection(STH/LTH) API function is used to place either an "STH" or "LTH" indicator onto the heap memory context stack 500. Also, a PopHeapSelection( ) API function is used to remove an indicator from the heap memory context stack 500. If the "STH" indicator (such as a value of 0) is at the top of the heap memory context stack 500 when a GetMemoryFloating( ) or GetMemoryFixed( ) API function call is made, a block of memory is allocated from a short-term heap. If the "LTH" indicator (such as a value of 1) is at the top of the heap memory context stack 500 when the GetMemoryFloating( ) or GetMemoryFixed( ) API function call is made, a block of memory is allocated from a long-term heap. Alternatively, one of these two values (such as "LTH") could be used as a default, and only the other value (such as "STH") needs to be pushed and popped from the heap memory context stack 500. The "top" of a stack in this example is the value preceding the pointer 504 in FIG. 5. In other words, the "top" of a stack refers to the value most recently pushed onto the stack.

The following represents an example usage of the Push-HeapSelection(STH/LTH) and PopHeapSelection( ) API functions.

| | |
|---|---|
| MyObj1 = New ObjType | // allocate from heap currently |
| | // selected or from default heap |
| ... | |
| PushHeapSelection(LTH) | // direct allocations to LTH |
| MyObj2 = New ObjType | // allocate from LTH |
| ... | |
| PopHeapSelection( ) | // return to prior state |
| PushHeapSelection(STH) | // direct allocations to STH |
| MyObj3 = New ObjType | // allocate from STH |
| MyObj4 = New ObjType | // allocate from STH |
| ... | |
| PushHeapSelection(LTH) | // temporarily redirect to LTH |
| MyObj5 = New ObjType | // allocate from LTH |
| ... | |
| PopHeapSelection( ) is STH | // return to prior state, which |
| MyObj6 = New ObjType | // allocate from STH |
| MyObj7 = New ObjType | // allocate from STH |
| ... | |
| PopHeapSelection( ) | // return to prior state |
| MyObj8 = New ObjType | // allocate from heap currently |
| | // selected or from default heap |

In this example, the MyObj1 object is allocated from whatever heap is currently identified in the heap memory context stack 500 or from a default heap (if no heap is identified in the heap memory context stack 500). In some embodiments, the long-term heap represents the default heap. The MyObj2 object is allocated from a long-term heap because the "LTH" indicator was pushed onto the heap memory context stack 500. The MyObj3 and MyObj4 objects are allocated from a short-term heap because the "STH" indicator was pushed onto the heap memory context stack 500. The MyObj5 object is allocated from a long-term heap because the "LTH" indicator was pushed onto the heap memory context stack 500. The MyObj6 and MyObj7 objects are allocated from a short-term heap because the "LTH" indicator was popped from the heap memory context stack 500 and the "STH" remains in the heap memory context stack 500. The MyObj8 object is allocated from whatever heap is now currently identified in the heap memory context stack 500 or from a default heap.

In particular embodiments, objects that can be allocated from a short-term heap are associated with classes that have a CAN USE STH attribute or other attribute. The value of this attribute controls whether objects can be allocated memory space from a short-term heap. In these embodiments, an object may be allocated memory space from a short-term heap if (i) the object's associated class has an attribute value allowing use of the short-term heap, and (ii) the "STH" indicator is pushed onto the heap memory context stack 500 (or the "STH" indicator is used by default when there is no entry in the heap memory context stack 500). If both conditions are not met, the object is allocated memory space from a long-term heap, even if the "STH" indicator is pushed onto the heap memory context stack 500.

In this way, a managed application can control which heap is used for a particular memory allocation request. Also, applications that do not require a specific heap need not use the heap memory context stack 500 because a default heap (such as the long-term heap) may be used for memory requests from those applications. Further, the use of the heap memory context stack 500 may have a low computational cost. Beyond that, as explained in more detail below, the heap memory context stack 500 provides a way to determine when a short-term heap memory can be abandoned and reinitialized, without affecting the long-term heap.

In addition, the heap memory context stack 500 allows a specific heap memory to be used in a context-insensitive manner. In other words, a specific heap could be used by pushing an STH or LTH indicator onto the heap memory context stack 500, and the execution environment 200 may return to a prior state by popping the indicator from the heap memory context stack 500. The return to the prior state occurs without knowing what that prior state was. In this way, the heap memory context stack 500 allows for a locality of knowledge (knowledge of which heap memory is used by pushing an "STH" or "LTH" indicator onto the context stack 500) while maintaining a beneficial "knowledge hiding" of the larger external context. This means a program may perform a push ("STH" or "LTH"), allocate memory, and perform a pop. This may be done with no knowledge about or concern for what other programs may have done. This locality of knowledge may support good programming practices because it may eliminate external dependencies, which are often the cause of errors.

In particular embodiments, references to objects allocated from a short-term heap memory 400 may be stored in that short-term heap memory 400. This may help to ensure that the object references are deallocated at the same time the objects are deallocated. Also, a "finalizer" represents a method used by an object to free resources and perform other "cleanup" operations before memory occupied by the object is reclaimed. The use of finalizers could be prohibited for objects allocated from a short-term heap memory 400, or the finalizers could be required to conform to particular specifications that ensure the finalizers are deterministic. In addition, the execution environment 200 could execute multiple threads, and each thread may have its own short-term heap memory 400. When each thread is scheduled for execution, the execution environment 200 could update a global heap structure to identify the proper short-term heap memory 400 for that thread. A heap memory context stack 500 could be provided for each thread, or multiple threads could share the same heap memory context stack 500.

The following represents one specific example of how the heap memory context stack 500 could be used in the execution environment 200. In some embodiments, the managed applications being executed in the execution environment 200 are cyclic or aperiodic (such as event driven or "one-shot" applications). Cyclic applications are periodic in nature, meaning they are repeatedly executed. Event driven applications are triggered by external events (such as network or user commands) and go dormant when execution is complete. One-shot applications are similar to event driven applications but terminate when their execution is complete. Before execution of a cyclic managed application begins, the "STH" indicator may be pushed onto the heap memory context stack 500. The cyclic managed application therefore operates using the short-term heap memory 400 unless the "LTH" indicator is pushed onto the heap memory context stack 500. Once the use of the long-term heap is complete, the "LTH" indicator is popped from the heap memory context stack 500. Eventually, the final "STH" indicator is popped from the heap memory context stack 500. At this point, no "STH" indicators remain in the heap memory context stack 500, and the entire short-term heap memory 400 may be reclaimed (such as by resetting the pointer 404). Alternatively, the managed application could invoke an API function, such as AbandonSTH( ) to explicitly instruct the memory manager 214 to reclaim the short-term heap memory 400.

Although FIG. 5 illustrates one example of a heap memory context stack 500, various changes may be made to FIG. 5. For example, the heap memory context stack 500 could include any suitable number of entries 502. Also, any suitable indicators could be inserted into the heap memory context stack 500, such as strings or integers.

Figure 6A:
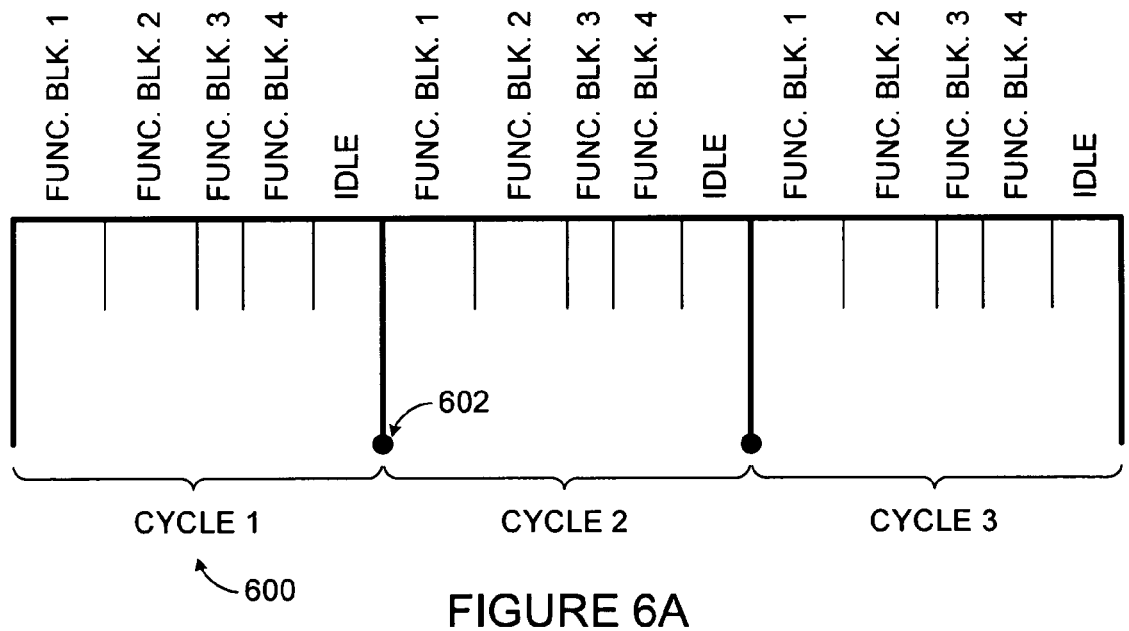
FIGS. 6A through 6C illustrate example timings of a garbage collection process involving a short-term heap memory according to one embodiment of this disclosure.
Figure 6B:
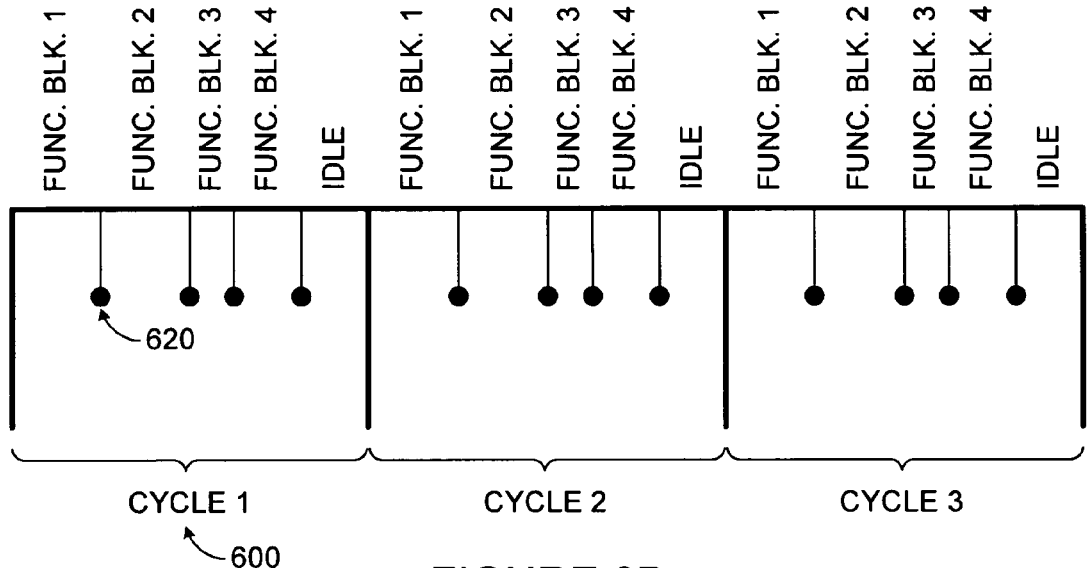
Figure 6C:
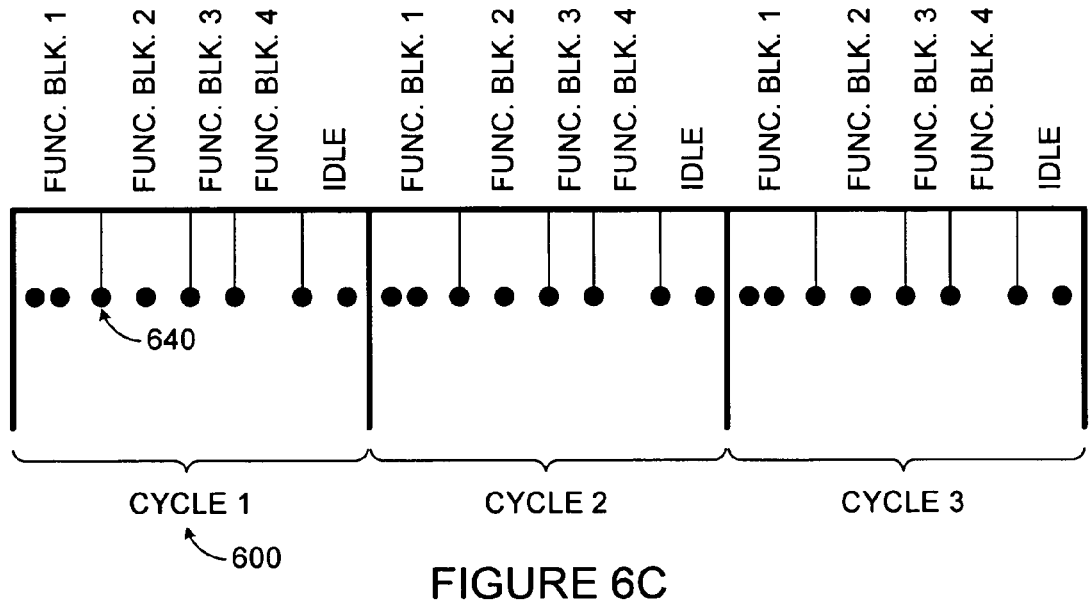

FIGS. 6A through 6C illustrate example timings of a garbage collection process involving a short-term heap memory according to one embodiment of this disclosure. In particular, FIGS. 6A through 6C illustrate how a short-term heap may be abandoned and reinitialized in the background of the execution environment 200. The timings shown in FIGS. 6A through 6C are for illustration only. Other garbage collection timings of a short-term heap could be used without departing from the scope of this disclosure.

In general, the phrase "garbage collection process" refers to the process of reclaiming memory space. For example, garbage collection is often performed to reclaim memory space that is no longer being used by applications. In a short-term heap, memory space is typically allocated to managed applications, but the managed applications often do not explicitly deallocate the memory space. The garbage collection process abandons and then reinitializes the short-term heap, thereby reclaiming the memory space. As noted above, abandonment and reinitialization of a short-term heap memory 400 could involve resetting a pointer 404 in the short-term heap memory 400 to the beginning address of the short-term heap memory 400. This allows the short-term heap memory 400 to be quickly and repeatedly abandoned and reinitialized.

As shown in FIG. 6A, execution in the execution environment 200 is divided into multiple cycles 600, each of which includes multiple time slices. The time slices in each cycle 600 are used by different functional blocks (the managed applications), except for one idle period where housekeeping tasks such as heap management are performed.

In the example shown in FIG. 6A, abandonment and reinitialization of the short-term heap memory 400 occur at the end of each cycle 600. The circles 602 shown in FIG. 6A illustrate when the abandonment and reinitialization of the short-term heap memory 400 occur using this technique.

As shown in FIG. 6B, the short-term heap memory 400 could also be abandoned and reinitialized at the end of the execution of each functional block. The circles 620 shown in FIG. 6B illustrate when the abandonment and reinitialization of the short-term heap memory 400 occur using this technique.

In addition, as shown in FIG. 6C, the short-term heap memory 400 for a stack frame could be abandoned and reinitialized at the end of the execution of the method for which the stack frame was created. The circles 640 shown in FIG. 6C illustrate when the abandonment and reinitialization of the short-term heap memory 400 occur using this technique. In FIG. 6C, the short-term heap memory 400 could be abandoned and reinitialized once at the end of the execution of a functional block or multiple times during execution of a functional block.

In particular embodiments, cyclic applications typically use a short-term heap memory during each cycle 600. However, the cyclic applications typically use the short-term heap memory only for a length of time not exceeding one cycle 600. This short lifespan of short-term heap memory use may allow the short-term heap memory to be repeatedly abandoned and reinitialized, whether the abandonment or reinitialization occurs once or multiple times each cycle 600.

Although FIGS. 6A through 6C illustrate various examples of timings of a garbage collection process involving a short-term heap memory, various changes may be made to FIGS. 6A through 6C. For example, the various techniques shown in FIGS. 6A through 6C may be used by the memory manager 214 to manage a short-term heap memory 400 in the execution environment 200. The memory manager 214 could use any other or additional techniques to manage a short-term heap memory 400. As a particular example, the memory manager 214 could determine whether each block 402 in a short-term heap memory 400 is no longer being used by the application that requested it. If no block 402 is still being used, the memory manager 214 could reclaim the short-term heap memory 400.

Figure 7:
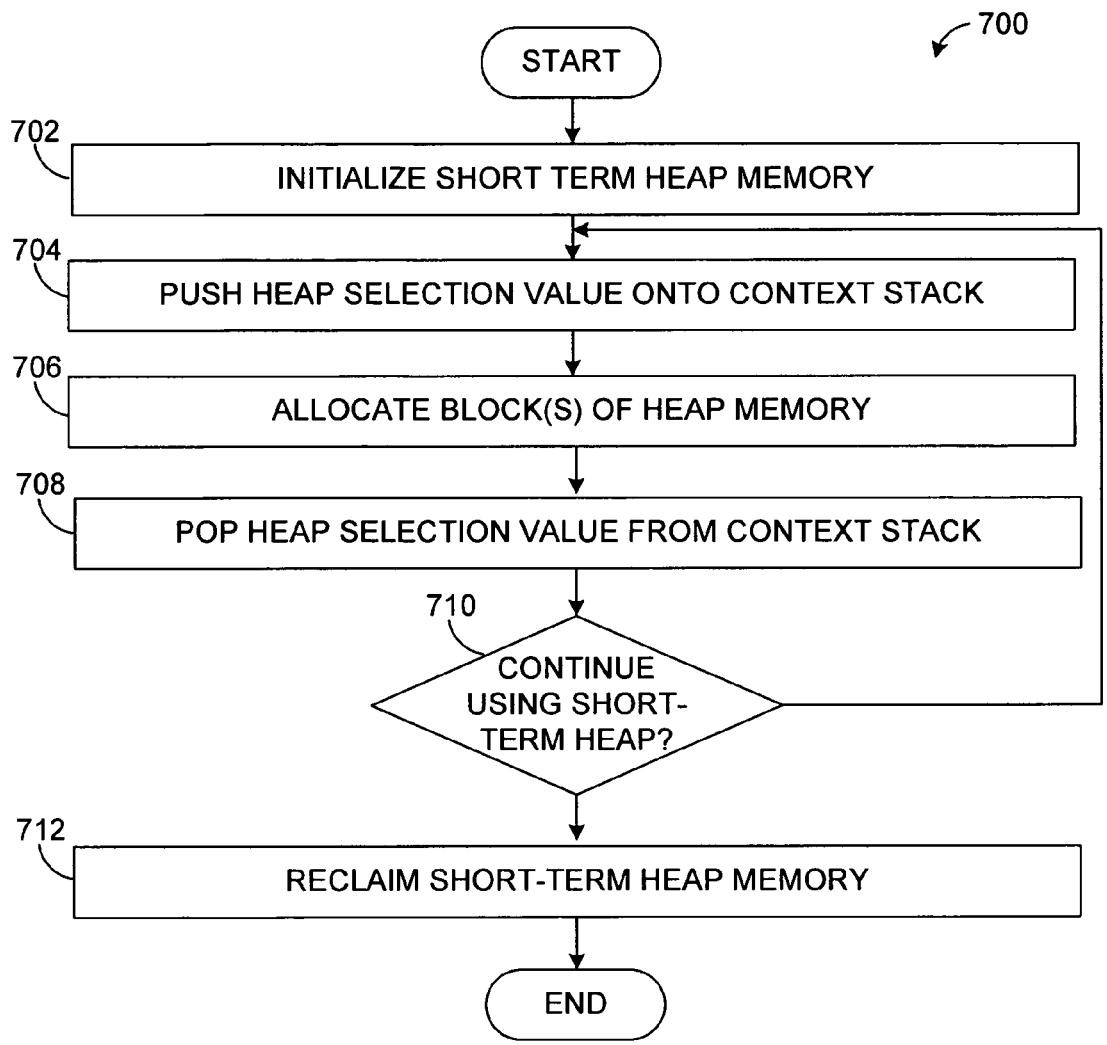
FIG. 7 illustrates an example method for managing a short-term heap memory according to one embodiment of this disclosure.

FIG. 7 illustrates an example method 700 for managing a short-term heap memory according to one embodiment of this disclosure. For ease of explanation, the method 700 is described with respect to the memory manager 214 of FIG. 2 managing the heap memory 300 shown in FIG. 3, which includes the short-term heap memory 400 of FIG. 4. The method 700 could be used in any other suitable environment to manage any other suitable heap memory.

The memory manager 214 initializes a short-term heap memory 400 at step 702. For example, the memory manager 214 may first initialize a management area 302. After that, the memory manager 214 may obtain a quantity of memory space for use as the heap area 304 of a new heap memory 300. The memory space in the heap area 304 includes the short-term heap memory 400. In some embodiments, the entire heap area 304 represents the short-term heap memory 400, and a second heap memory 300 is used as a long-term heap. In other embodiments, the heap area 304 includes both the short-term heap memory 400 and a long-term heap. Also, in some embodiments, the heap area 304 is somewhat larger than the amount of memory requested. In these embodiments, the additional memory is used to provide buffering both before and after the actual heap. Information about where the heap area 304 is located may be stored in the management area 302.

A managed application pushes a heap selection value onto a heap memory context stack at step 704. This may include, for example, the managed application pushing a "LTH" or "STH" indicator onto the heap memory context stack 500. The indicator could represent a string, an integer, or any other suitable value.

The memory manager 214 allocates one or more blocks of heap memory at step 706. This may include, for example, the memory manager 214 receiving one or more requests for heap memory from the managed application. This may also include the memory manager 214 allocating blocks of heap memory to the managed application. The blocks of heap memory are allocated from the short-term heap memory 400 or the long-term heap, depending on the indicator at the top of the heap memory context stack 500. If allocated from the short-term heap memory 400, a new block 402 of memory may be allocated beginning at the location identified by the pointer 404, and the pointer 404 may be moved. In addition, this may include the memory manager 214 confirming whether adequate memory space is available in the heap memory.

The managed application pops a heap selection value from the heap memory context stack at step 708. This may include, for example, the managed application popping a "LTH" or "STH" indicator from the heap memory context stack 500. The popping may be done after the allocation of memory for the managed application is complete.

At this point, the memory manager 214 determines if the short-term heap memory should continue to be used at step 710. This may include, for example, the memory manager 214 determining whether any "STH" or "LTH" indicators remain in the heap memory context stack 500. If the pop operation at step 708 popped the last remaining indicator from the heap memory context stack 500, the memory manager 214 reclaims the short-term heap memory 400 at step 712. This may include, for example, the memory manager 214 resetting the pointer 404 of the short-term heap memory 400 to the beginning memory address of the short-term heap memory 400. Otherwise, at least one indicator remains in the short-term heap memory 400, and the memory manager 214 returns to step 704 to allow use of the short-term heap memory 400.

Although FIG. 7 illustrates one example of a method 700 for managing a short-term heap memory, various changes may be made to FIG. 7. For example, a managed application need not push an "LTH" or "STH" indicator onto the heap memory context stack 500 before requesting memory space in a heap. Rather, if the managed application does not care where a particular memory block is located, the managed application could request an allocation of memory from whatever heap is currently specified or from a default heap.

In some embodiments, the various functions performed within or in conjunction with the memory manager 214 are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. A method, comprising:
   executing one or more applications in an execution environment, the one or more applications requesting allocation of memory during execution;
   allocating a plurality of memory blocks in a first heap to the one or more executing applications, the plurality of memory blocks allocated sequentially in the first heap to the one or more executing applications, wherein allocating the plurality of memory blocks in the first heap comprises allocating a particular one of the memory blocks in the first heap to a particular one of the one or more executing applications based on an indicator identifying the first heap that is pushed by the particular executing application onto a heap memory context stack, wherein the particular executing application is configured to pop the indicator from the heap memory context stack, and wherein the one or more executing applications are identified as configured to use the first heap; and
   deallocating the plurality of memory blocks in the first heap during a single deallocation, wherein the allocating the plurality of memory blocks and deallocating the plurality of memory blocks is preformed through a predictive deterministic memory manager, wherein deallocating the plurality of memory blocks in the first heap comprises deallocating the plurality of memory blocks in the first heap when a last indicator identifying the first heap is popped from the heap memory context stack.
2. The method of claim 1, wherein:
   a pointer identifies a starting location of unallocated memory in the first heap;
   allocating the plurality of memory blocks in the first heap comprises allocating each memory block in the first heap starting at the location identified by the pointer; and
   further comprising updating the pointer to identify a Previously Presented starting location after each allocation in the first heap.
3. The method of claim 2, wherein deallocating the plurality of memory blocks in the first heap comprises resetting the pointer to identify a beginning location of the first heap.
4. The method of claim 1, further comprising:
   allocating a plurality of memory blocks in a second heap to the one or more executing applications.
5. The method of claim 4, wherein:
   the first heap comprises a short-term heap; and
   the second heap comprises a long-term heap.
6. The method of claim 4, wherein:
   the first and second heaps comprise short-term heaps associated with different executing applications; and
   further comprising deallocating the plurality of memory blocks in the second heap during a single deallocation associated with the second heap.
7. The method of claim 1, wherein:
   the first heap comprises a short-term heap;
   the one or more executing applications comprise one or more cyclic applications executed during a plurality of cycles; and
   during each of the cycles, the one or more cyclic applications use the allocated memory blocks in the first heap only for a length of time not exceeding one cycle.
8. An apparatus, comprising:
   a memory comprising a first heap and a stack; and
   a memory manager configured to:
      allocate a plurality of memory blocks in the first heap to one or more applications executed in an execution environment, the memory manager configured to allocate the plurality of memory blocks sequentially in the first heap to the one or more executing applications, wherein the memory manager is configured to allocate a particular one of the memory blocks in the first heap to a particular one of the one or more executing applications based on an indicator identifying the first heap that is pushed by the particular executing application onto the stack, and wherein the particular executing application is configured to pop the indicator from the stack; and deallocate the plurality of memory blocks in the first heap during a single deallocation wherein the allocating the plurality of memory blocks and deallocating the plurality of memory blocks is preformed through a predictive deterministic memory manager, wherein the memory manager is configured to deallocate the plurality of memory blocks in the first heap when a last indicator identifying the first heap is popped from the stack.

9. The apparatus of claim 8, wherein:

a pointer identifies a starting location of unallocated memory in the first heap;

the memory manager is configured to allocate each memory block in the first heap starting at the location identified by the pointer; and the memory manager is further configured to update the pointer to identify a Previously Presented starting location after each allocation in the first heap.

10. The apparatus of claim 9, wherein the memory manager is configured to deallocate the plurality of memory blocks in the first heap by resetting the pointer to identify a beginning location of the first heap.

11. The apparatus of claim 8, wherein:

the memory further comprises a second heap; and the memory manager is further configured to allocate a plurality of memory blocks in the second heap to the one or more executing applications.

12. A non-transitory computer readable medium comprising a computer program, the computer program comprising computer readable program code for:

allocating a plurality of memory blocks in a first heap to one or more applications executed in an execution environment, the plurality of memory blocks allocated sequentially in the first heap to the one or more executing applications, wherein the computer readable program code for allocating the plurality of memory blocks in the first heap comprises computer readable program code for allocating a particular one of the memory blocks in the first heap to a particular one of the one or more executing applications based on an indicator identifying the first heap that is pushed by the particular executing application onto a stack, and wherein the particular executing application is configured to pop the indicator from the stack; and deallocating the plurality of memory blocks in the first heap during a single deallocation wherein the allocating the plurality of memory blocks and deallocating the plurality of memory blocks is preformed through a predictive deterministic memory manager, wherein the computer readable program code for deallocating the plurality of memory blocks in the first heap comprises computer readable program code for deallocating the plurality of memory blocks in the first heap when a last indicator identifying the first heap is popped from the stack.

13. The non-transitory computer readable medium of claim 12, wherein:

a pointer identifies a starting location of unallocated memory in the first heap; the computer readable program code for allocating the plurality of memory blocks in the first heap comprises computer readable program code for allocating each memory block in the first heap starting at the location identified by the pointer; and further comprising computer readable program code for updating the pointer to identify a Previously Presented starting location after each allocation in the first heap.

14. The non-transitory computer readable medium of claim 13, wherein the computer readable program code for deallocating the plurality of memory blocks in the first heap comprises computer readable program code for resetting the pointer to identify a beginning location of the first heap.

15. The non-transitory computer readable medium of claim 12, further comprising:

computer readable program code for allocating a plurality of memory blocks in a second heap to the one or more executing applications.

16. The method of claim 1, wherein allocating the plurality of memory blocks in the first heap comprises:

allocating a first memory block at a beginning of the first heap; and allocating each subsequent memory block starting at a memory location that is immediately after a prior allocated memory block in the first heap.

17. The method of claim 1, wherein:

each of the one or more executing applications is associated with an attribute indicating whether memory blocks in the first heap can be allocated to that executing application; and allocating the plurality of memory blocks in the first heap comprises determining whether each executing application has an appropriate value for its attribute before allocating any memory blocks in the first heap to that executing application.

18. The method of claim 1, further comprising:

storing, in the first heap, all references to the memory blocks allocated in the first heap; and deallocating the references in the first heap during the single deallocation.

19. The apparatus of claim 8, wherein:

each of the one or more executing applications is associated with an attribute indicating whether memory blocks in the first heap can be allocated to that executing application; and the memory manager is configured to determine whether each executing application has an appropriate value for its attribute before allocating any memory blocks in the first heap to that executing application.

20. The apparatus of claim 11, wherein the memory manager is further configured to deallocate the plurality of memory blocks in the second heap during a single deallocation in response to an API function invoked by one of the one or more executing applications, the API function explicitly instructing the memory manager to reclaim the second heap.

21. The non-transitory computer readable medium of claim 12, wherein:

each of the one or more executing applications is associated with an attribute indicating whether memory blocks in the first heap can be allocated to that executing application; and the computer readable program code for allocating the plurality of memory blocks in the first heap comprises computer readable program code for determining whether each executing application has an appropriate value for its attribute before allocating any memory blocks in the first heap to that executing application.

\* \* \* \* \*